US008783900B2

(12) United States Patent
Holder et al.

(10) Patent No.: US 8,783,900 B2
(45) Date of Patent: Jul. 22, 2014

(54) LED REPLACEMENT LAMP AND A METHOD OF REPLACING PREEXISTING LUMINAIRES WITH LED LIGHTING ASSEMBLIES

(75) Inventors: Ronald G. Holder, Laguna Niguel, CA (US); Greg Rhoads, Irvine, CA (US)

(73) Assignee: Illumination Management Solutions, Inc., Irvine, CA (US)

( * ) Notice: Subject to any disclaimer, the term of this patent is extended or adjusted under 35 U.S.C. 154(b) by 0 days.

(21) Appl. No.: 13/602,450

(22) Filed: Sep. 4, 2012

(65) Prior Publication Data
US 2012/0327641 A1 Dec. 27, 2012

Related U.S. Application Data

(63) Continuation of application No. 12/629,461, filed on Dec. 2, 2009, now Pat. No. 8,256,919.

(60) Provisional application No. 61/119,487, filed on Dec. 3, 2008.

(51) Int. Cl.
*B60Q 1/26* (2006.01)
(52) U.S. Cl.
USPC ...... 362/227; 362/240; 362/249.02; 362/543; 362/545; 315/312; 315/297; 315/294; 257/79; 372/98
(58) Field of Classification Search
CPC ..... F21V 19/001; F21V 19/045; F21V 23/00; F21V 29/004; F21V 29/225; H05B 33/0803
USPC ............... 362/217.02, 227, 240, 249.02, 289, 362/311.02, 335, 543–545, 640, 800; 315/149, 291, 297, 294, 312, 169.1; 257/79, 82; 372/98, 99
See application file for complete search history.

(56) References Cited

U.S. PATENT DOCUMENTS

| | | |
|---|---|---|
| 2,254,961 A | 9/1941 | Harris |
| 2,394,992 A | 2/1946 | Franck |

(Continued)

FOREIGN PATENT DOCUMENTS

| | | |
|---|---|---|
| CN | 2750186 | 1/2006 |
| CN | 1737418 | 2/2006 |

(Continued)

OTHER PUBLICATIONS

Aoyama, Y.; Yachi, T., "An LED Module Array System Designed for Streetlight Use," Energy 2030 Conference, 2008. Energy 2008. IEEE , vol., No., pp. 1-5, Nov. 17-18, 2008, doi: 10.1109/Energy.2008. 4780996; URL: http://ieeexplore.ieee.org/stamp/stamp.jsp?tp=&arnumber=4780996&isnumber=4780986.

(Continued)

*Primary Examiner* — Haiss Philogene
(74) *Attorney, Agent, or Firm* — King & Spalding LLP

(57) ABSTRACT

A lighting apparatus for retrofitting an existing luminaire includes a plurality of light emitting diodes (LED) of similar or differing wavelengths arranged and configured in at least one light bar array, a heat sink module thermally coupled to the at least one light bar array, an electronic power module electrically coupled to the at least one light bar array, and a plate coupled to the at least one light bar array, electronic power module and the heat sink module, the plate arranged and configured for coupling to the luminaire to provide quick and easy installation and replacement of the at least one light bar array, heat sink module and electronic power module into and from the luminaire.

21 Claims, 7 Drawing Sheets

(56) References Cited

U.S. PATENT DOCUMENTS

| | | | |
|---|---|---|---|
| 2,908,197 A | 10/1959 | Wells et al. | |
| 3,596,136 A | 7/1971 | Fischer | |
| 3,647,148 A | 3/1972 | Wince | |
| 3,927,290 A | 12/1975 | Denley | |
| 4,345,308 A | 8/1982 | Mouyard et al. | |
| 4,460,945 A | 7/1984 | Chan | |
| 4,729,076 A | 3/1988 | Masami | |
| 4,734,836 A | 3/1988 | Negishi | |
| 4,860,177 A | 8/1989 | Simms | |
| 4,907,044 A | 3/1990 | Schellhorn et al. | |
| 4,941,072 A | 7/1990 | Yasumoto | |
| 5,636,057 A | 6/1997 | Dick et al. | |
| 5,782,555 A | 7/1998 | Hochstein | |
| 5,857,767 A | 1/1999 | Hochstein | |
| 5,924,788 A | 7/1999 | Parkyn, Jr. | |
| 5,939,996 A | 8/1999 | Kniveton et al. | |
| 6,045,240 A | 4/2000 | Hochstein | |
| 6,050,707 A | 4/2000 | Kondo et al. | |
| 6,102,558 A | 8/2000 | Farnoux | |
| 6,227,684 B1 | 5/2001 | Wijbenga | |
| 6,227,685 B1 | 5/2001 | McDermott | |
| 6,273,596 B1 | 8/2001 | Parkyn, Jr. | |
| 6,341,466 B1 | 1/2002 | Kehoe et al. | |
| 6,345,800 B1 | 2/2002 | Herst et al. | |
| 6,441,558 B1 | 8/2002 | Muthu et al. | |
| 6,461,008 B1 | 10/2002 | Pederson | |
| 6,502,956 B1 | 1/2003 | Wu | |
| 6,527,422 B1 | 3/2003 | Hutchison | |
| 6,536,923 B1 | 3/2003 | Merz | |
| 6,560,038 B1 | 5/2003 | Parkyn et al. | |
| 6,598,998 B2 | 7/2003 | West et al. | |
| 6,639,733 B2 | 10/2003 | Minano | |
| 6,784,357 B1 | 8/2004 | Wang | |
| 6,785,053 B2 | 8/2004 | Savage, Jr. | |
| 6,837,605 B2 | 1/2005 | Reill | |
| 6,850,001 B2 | 2/2005 | Takekuma | |
| 6,895,334 B2 | 5/2005 | Yabe | |
| 6,942,361 B1 | 9/2005 | Kishimura et al. | |
| 6,948,838 B2 | 9/2005 | Kunstler | |
| 6,965,715 B2 | 11/2005 | Lei | |
| 6,997,580 B2 | 2/2006 | Wong | |
| 7,070,310 B2 | 7/2006 | Pond et al. | |
| 7,073,931 B2 | 7/2006 | Ishida | |
| 7,090,370 B2 | 8/2006 | Clark | |
| 7,102,172 B2 | 9/2006 | Lynch et al. | |
| 7,104,672 B2 | 9/2006 | Zhang | |
| 7,153,015 B2 | 12/2006 | Brukilacchio | |
| 7,172,319 B2 | 2/2007 | Holder | |
| 7,181,378 B2 | 2/2007 | Benifez | |
| 7,204,627 B2 | 4/2007 | Hishida | |
| 7,237,936 B1 | 7/2007 | Gibson | |
| 7,278,761 B2 | 10/2007 | Kuan | |
| 7,281,820 B2 | 10/2007 | Bayat et al. | |
| 7,322,718 B2 | 1/2008 | Setomoto et al. | |
| D563,036 S | 2/2008 | Miyairi et al. | |
| 7,329,030 B1 | 2/2008 | Wang | |
| 7,329,033 B2 | 2/2008 | Glovatsky | |
| 7,339,200 B2 | 3/2008 | Amano et al. | |
| 7,348,604 B2 | 3/2008 | Matheson | |
| 7,348,723 B2 | 3/2008 | Yamaguchi et al. | |
| 7,352,011 B2 | 4/2008 | Smits et al. | |
| 7,410,275 B2 | 8/2008 | Sommers et al. | |
| D577,852 S | 9/2008 | Miyairi et al. | |
| 7,460,985 B2 | 12/2008 | Benitez | |
| 7,461,948 B2 | 12/2008 | Van Voorst Vader et al. | |
| 7,507,001 B2 | 3/2009 | Kit | |
| 7,513,639 B2 | 4/2009 | Wang | |
| 7,569,802 B1 | 8/2009 | Mullins | |
| 7,572,027 B2 | 8/2009 | Zampini, II | |
| 7,572,654 B2 | 8/2009 | Chang | |
| 7,575,354 B2 | 8/2009 | Woodward | |
| 7,618,162 B1 | 11/2009 | Parkyn et al. | |
| 7,625,102 B2 | 12/2009 | Koike et al. | |
| 7,637,633 B2 | 12/2009 | Wong | |
| 7,674,018 B2 | 3/2010 | Holder et al. | |
| 7,775,679 B2 | 8/2010 | Thrailkill et al. | |
| 7,809,237 B2 | 10/2010 | Pozdnyakov et al. | |
| 7,942,559 B2 | 5/2011 | Holder | |
| 7,959,332 B2 * | 6/2011 | Tickner et al. | 362/373 |
| 7,972,035 B2 | 7/2011 | Boyer | |
| 7,972,036 B1 | 7/2011 | Schach et al. | |
| 7,993,036 B2 | 8/2011 | Holder et al. | |
| 8,007,140 B2 | 8/2011 | Zhang et al. | |
| 8,123,386 B2 * | 2/2012 | Moshtagh | 362/373 |
| 8,256,919 B2 * | 9/2012 | Holder et al. | 362/227 |
| 2002/0034081 A1 | 3/2002 | Serizawa | |
| 2003/0067787 A1 | 4/2003 | Serizawa | |
| 2003/0099115 A1 | 5/2003 | Reill | |
| 2004/0037076 A1 | 2/2004 | Katoh et al. | |
| 2004/0070855 A1 | 4/2004 | Benitez et al. | |
| 2004/0105171 A1 | 6/2004 | Minano et al. | |
| 2004/0105261 A1 | 6/2004 | Ducharme | |
| 2004/0105264 A1 | 6/2004 | Spero | |
| 2004/0189933 A1 | 9/2004 | Sun et al. | |
| 2004/0207999 A1 | 10/2004 | Suehiro | |
| 2004/0218388 A1 | 11/2004 | Suzuki | |
| 2004/0222947 A1 | 11/2004 | Newton et al. | |
| 2004/0228127 A1 | 11/2004 | Squicciarini | |
| 2005/0073849 A1 | 4/2005 | Rhoads et al. | |
| 2005/0207165 A1 | 9/2005 | Shimizu et al. | |
| 2006/0034082 A1 | 2/2006 | Park | |
| 2006/0039143 A1 | 2/2006 | Katoh | |
| 2006/0081863 A1 | 4/2006 | Kim et al. | |
| 2006/0083003 A1 | 4/2006 | Kim et al. | |
| 2006/0138437 A1 | 6/2006 | Huang et al. | |
| 2006/0238884 A1 | 10/2006 | Jang | |
| 2006/0245083 A1 | 11/2006 | Chou et al. | |
| 2006/0250803 A1 | 11/2006 | Chen | |
| 2006/0255353 A1 | 11/2006 | Taskar | |
| 2006/0285311 A1 | 12/2006 | Chang et al. | |
| 2007/0019415 A1 | 1/2007 | Leblanc | |
| 2007/0019416 A1 | 1/2007 | Han | |
| 2007/0058369 A1 | 3/2007 | Parkyn et al. | |
| 2007/0063210 A1 | 3/2007 | Chiu | |
| 2007/0066310 A1 | 3/2007 | Haar | |
| 2007/0076414 A1 | 4/2007 | Holder | |
| 2007/0081338 A1 | 4/2007 | Kuan | |
| 2007/0081340 A1 | 4/2007 | Chung et al. | |
| 2007/0091615 A1 | 4/2007 | Hsieh et al. | |
| 2007/0183736 A1 | 8/2007 | Pozdnyakov | |
| 2007/0201225 A1 | 8/2007 | Holder | |
| 2007/0258214 A1 | 11/2007 | Shen | |
| 2008/0013322 A1 | 1/2008 | Ohkawa | |
| 2008/0019129 A1 | 1/2008 | Wang | |
| 2008/0025044 A1 | 1/2008 | Park et al. | |
| 2008/0043473 A1 | 2/2008 | Matsui | |
| 2008/0055908 A1 | 3/2008 | Wu | |
| 2008/0068799 A1 | 3/2008 | Chan | |
| 2008/0080188 A1 | 4/2008 | Wang | |
| 2008/0100773 A1 | 5/2008 | Hwang | |
| 2008/0174996 A1 | 7/2008 | Lu | |
| 2008/0239722 A1 | 10/2008 | Wilcox | |
| 2008/0273327 A1 | 11/2008 | Wilcox et al. | |
| 2009/0244895 A1 | 10/2009 | Chen | |
| 2009/0262543 A1 | 10/2009 | Ho | |
| 2010/0014290 A1 | 1/2010 | Wilcox | |

FOREIGN PATENT DOCUMENTS

| | | |
|---|---|---|
| DE | 202006015981 | 1/2007 |
| EP | 1431653 | 6/2004 |
| GB | 718425 | 11/1954 |
| GB | 794670 | 5/1958 |
| GB | 815609 | 7/1959 |
| JP | 06-177424 | 6/1994 |
| JP | 11/154766 | 9/1997 |
| JP | 2001-517855 | 9/1998 |
| JP | 2005-062461 | 3/2005 |
| KR | 10-2006-0033572 | 4/2006 |
| KR | 10-2006-0071033 | 6/2006 |
| WO | WO 9624802 | 8/1996 |
| WO | WO 98/33007 | 7/1998 |
| WO | WO 03044870 | 5/2003 |
| WO | WO 2004/068909 | 8/2004 |

(56) References Cited

FOREIGN PATENT DOCUMENTS

| WO | WO 2005/041254 | 5/2005 |
|---|---|---|
| WO | WO 2005/057082 | 6/2005 |
| WO | WO 2005/093316 | 10/2005 |
| WO | WO 2007/100837 | 9/2007 |
| WO | WO 2008/144672 | 11/2008 |
| WO | WO 2010/019810 | 2/2010 |
| WO | WO 2011/098515 | 8/2011 |

OTHER PUBLICATIONS

Petroski, J.; Norley, J.; Schober, J.; Reis, B.; Reynolds, R.A.; , "Conduction cooling of large LED array systems," Thermal and Thermomechanical Phenomena in Electronic Systems (ITherm), 2010 12th IEEE Intersociety Conference on , vol., No., pp. 1-10, Jun. 2-5, 2010; doi: 10.1109/ITherm.2010.5501350; URL: http://ieeexplore.ieee.org/stamp/stamp.jsp?tp=&arnumber=5501350&isnumber=5501251.

Wankhede, M.; Khaire, V.; Goswami, A.; Mahajan, S.D.; , "Evaluation of Cooling Solutions for Out-door Electronics," Electronics Packaging Technology Conference, 2007. EPTC 2007. 9th , vol., No., pp. 858-863, Dec. 10-12, 2007; doi: 10.1109/EPTC.2007.4469682; URL: http://ieeexplore.ieee.org/stamp/stamp.jsp?tp=&arnurnber=4469682&isnumber=4469670.

Streetworks fixture from Cooper Lighting and 2 IES files, Aug. 14, 2001.

Bisberg, *LED Magazine*, The 5mm. Package Versus the Power LED: Not a Light choice for the Luminaire Designer, pp. 19-21, Dec. 2005.

*LED Magazine*, p. 36 Oct. 2005.

International Search Report and Written Opinion for WO 2010/019810 mailed Sep. 30, 2009.

International Search Report and Written Opinion for WO 2008/144672 mailed Nov. 27, 2008.

ISR and Written Opinion of ISA, PCT/US07/05118 mailed Mar. 11, 2008.

Bortz, "Optimal Design of a Non imaging Projection Lens for Use with an LED Light Source and a Rec-tangular Sheet." SPIE, pp. 130-138, vol. 4092, USA, published 2000.

International Search Report for PCT/US08/64168 mailed on Aug. 15, 2008.

Extended Search Report for EP Application No. 11006191 mailed Nov. 7, 2011.

Extended Search Report for EP Application No. 11006189 mailed Nov. 7, 2011.

Extended Search Report for EP Application No. 11006190 mailed Nov. 7, 2011.

Timinger, Dr. Andreas, *High Performance Optics Design for LEDs*, Strategies in Light, Feb. 2005.

Ries, Harold & Julius Muschaweck, *Tailored Freeform Optical Surfaces*, Optical Society of America, vol. 19, No. 3, Mar. 2002.

Extended Search Report for EP Application No. 08755907.6 mailed May 10, 2012.

Jolley L.B.W. et al., The Therory and Design of Illuminating Engineering Equipment, 1931.

Order; Case No. 11-CV-34-JPS; United States District Court Eastern District of Wisconsin; Jun. 8, 2012; (referencing U.S. Patent Nos. 7,674,018 and 7,993,036).

International Search Report for PCT/US11/049388 mailed on Apr. 9, 2012.

Timinger, Andreas, Strategies Unlimited, "Charting New Directions in High-Brightness LED's ," Strategies in Light, Feb. 5-7, 2003.

Timinger, Andreas, "Optical Design for LED-Street Lamps," Conference Paper, Solid-State and Or-ganic Lighting (SOLED), Karlsruhe, Germany, Jun. 21, 2010.

\* cited by examiner

LED REPLACEMENT LAMP AND A METHOD OF REPLACING PREEXISTING LUMINAIRES WITH LED LIGHTING ASSEMBLIES

CROSS REFERENCE TO RELATED APPLICATIONS

This patent application is a continuation of and claims priority under U.S.C. §120 to U.S. application ser. No. 12/629,461, now U.S. Pat. No. 8,256,919 entitled "LED Replacement Lamp and a Method of Replacing Preexisting Luminaires with LED Lighting Assemblies" filed Dec. 2, 2009; which claim priority under 35 U.S.C. §119 to U.S. Provisional Patent Application, Ser. No. 61/119,487, filed on Dec. 3, 2008, the entirety of both which is incorporated by reference herein.

BACKGROUND OF THE INVENTION

Embodiments of the invention relate generally to the field of general lighting illumination and more particularly to the field of apparatus and methods for using light emitting diodes (LEDs) or other light sources in a replacement lamp module.

The initial investment cost of LED illumination is expensive when compared with traditional lighting means using the parameter of cost/lumen as the metric, even though the cost-lumen-hour or cost/lumen-lifetime-hours is substantially less than incandescent lighting when operating expenses are included.

Therefore, if a significant portion of the cost of a new lighting fixture for the can be eliminated by allowing for use of conventional lighting fixtures, LED lighting would find a larger market share faster than if a new LED fixture is required.

U.S. Pat. No. 7,347,706 describes the replacement of the existing screw-in lamp with a screw-in replacement. This technique does not offer enough thermal heat sinking to provide a sufficient amount of light for competitive use in the marketplace.

BRIEF SUMMARY OF THE INVENTION

One illustrated embodiment of the invention is an apparatus comprised of a plurality of light emitting diodes (LED) of similar or differing wavelengths situated in a fashion to retrofit an existing lumina ire providing the thermal, electrical and optic performance desired. An electronic power control and heat sin~module provides thermal management of the apparatus and electronically controls the individual LEDs. Instead of providing a separate heat sink module thermally coupled to the plurality of LEDs and/or electronic power control, the preexisting luminaire in appropriate applications may be thermally coupled to the electronic power control and/or plurality of LEDs to serve or function as a heat sink. In one embodiment there is at least one array of LEDs, a recessed cavity on the underside to provide shadowing of the beam to provide Dark Sky Initiative compliance, along with the electronic power control and heat sink module. The Dark Sky Initiative is an international policy to reduce light pollution, which is defined as any adverse effect of artificial light including sky glow, glare, light trespass, light clutter, decreased visibility at night, and energy waste. See www.darksky.org.

One illustrated embodiment of the invention uses one or more LED lightBARS™, such as those sold by Illumination Management Solutions of Irvine, Calif., or a single plate or array of LEDs as a replacement lamp module for existing or conventional luminaires. One such conventional luminaire, the 'Cobra Head'. is manufactured by many lumina ire manufacturers such as General Electric Co., Cooper Lighting, LLC and Philips Lumec. The Cobra Head is installed throughout North America and the world and is a ready market for an LED replacement lamp module. In one illustrated embodiment, the retrofitting of the luminaire typically results in the elimination of the protective glass or plastic cover, which was previously installed in the luminaire.

The illustrated embodiments of the invention can be substituted for the existing lamp and reflector technology by simply removing the interior components of the lumina ire and substituting the illustrated embodiment of the invention in place of the outer lens or protective glass and connecting three wires to the line input connector of the luminaire. The replacement can take as little as 20 minutes or less and it is possible to perform this replacement in situ.

One embodiment of the invention is comprised of a shaped plate that fits in the existing opening of a luminaire. The plate has a recessed portion to accommodate light bars or a light plate that is comprised of a plurality of LEDs with optics combined with each LED in an array to provide a predetermined light output pattern. The recess provides a shadowed zone of light from the LEDs and/or optics that prevents the light from extending around said opening of the luminaire. This allows the luminaire to meet the Dark Sky Initiative standards required in many regions of the world for outdoor lighting.

Another embodiment of the invention has the recess in a stamped shaped plate. The perimeter of the plate may also be rolled or formed and cut to fit the existing mounting features of the luminaire.

Still another embodiment has a heat sink extrusion attached to the backside to expel the heat generated from the LEDs into the cavity of the luminaire. The heat sink may be attached through the light bars to fix or clamp the shaped plate between the light bars and the heat sink extrusion. The heat sink may be in intimate contact with the inner surface of the fixture so as to render the fixture part of the thermal management system.

Yet another embodiment of the invention provides power to the LEDs via transformer or other power source where the light bars are strings of LEDs in series, parallel or both. The light bars provide power to the LEDs via pulse width modulation (PWM) or other onboard power conversion circuitry. Additionally, one illustrated embodiment of the invention provides dimming controls, color controls or other electronics applicable to outdoor lighting, including, but not limited to network addressing, radio frequency controls or communication.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. Embodiments of the invention can be better visualized by turning now to the following drawings wherein like elements are referenced by like numerals.

The various embodiments of the invention can now be better understood by turning to the following detailed description of illustrated example embodiments of the invention defined in the claims. It is expressly understood that the invention as defined by the claims may be broader than the illustrated embodiments described below.

DETAILED DESCRIPTION OF EMBODIMENTS OF THE INVENTION

Figure 1:
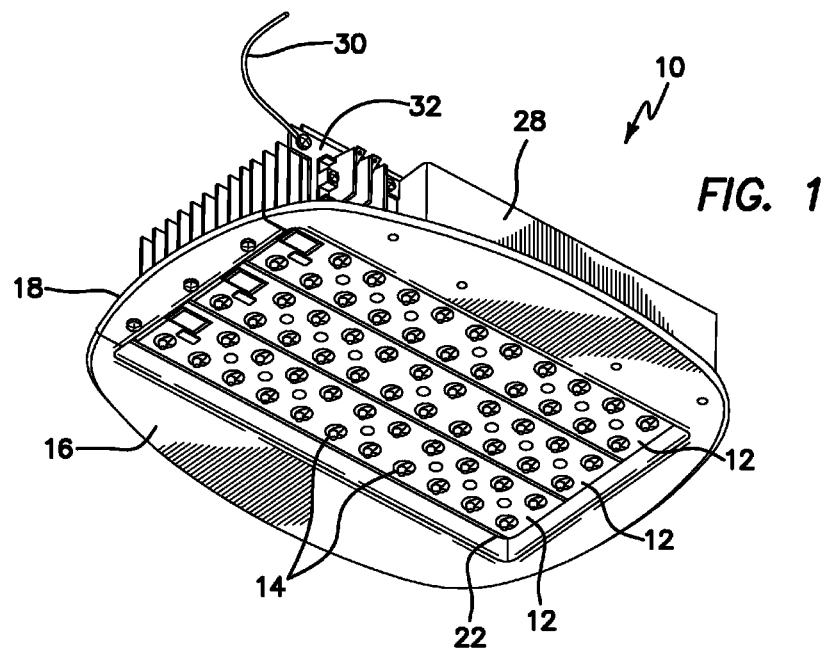
FIG. 1 is a perspective view of the lower or outside aperture of one embodiment of the invention. This embodiment is designed to fit a 'Cobra Head' luminaire shown in FIGS. 8-10.

LED lighting module, generally denoted by reference numeral 10, is shown in perspective view in FIG. 1 wherein the lower or outside light aperture is turned facing the viewer of the drawing. Module 10 includes a plurality of light bars 12, such as those manufactured by Cooper lighting, LLC. As will be described below, module 10 is scalable in the sense that it may be configured to selectively incorporate one, two or three light bars without an alteration in the design. light bars 12 may include any type of array now known or later devised, but are each light bar 12 is shown as including a double row optically lensed LEDs or LED packages 14 (hereinafter referenced collectively as LED or LEDs). It is to be expressly understood that wherever "light bar" or "light bar array" is used in the specification, it is meant to include, but is not limited to any type of planar or two-dimensional array of LEDs, including non-rectilinear arrays.

In the illustrated embodiment of FIG. 1, each of the LEDs 14 is combined with an optic or lens, which serves to direct the light from the LED chip or package into anyone of a plurality of selected light distribution patterns according to the application as hand. The selected light distribution patterns generated by LEDs 14 may be identical or may be different in one or more aspects, again according to the intended application at hand. Thus, it is to be expressly understood that in the illustrated embodiments there is no limitation on the type or characteristics which may be exhibited by LEDs 14 or the nature of the arrays 12 in which they are employed. For example, it is contemplated that each light bar 12 may be provided with a different type of LED, a different mixture of LED types and/or corresponding optics or lenses combined with the LEDs. In one of the illustrated embodiments, at least one of the light bars 12 is provided with a different color or spectrum of LEDs for special applications requiring color or spectral mixes of selected types of combinations. Such an embodiment may include the ability to selected turn selected ones of the light bars 12 on or off in different combinations for the purpose of color or spectral control.

In the embodiment of FIG. 1, light bars 12 are fixed or fitted into a stamped plate 16, which is also provided with a rolled or formed edge 18 on its periphery. Plate 16 and its corresponding heat sink 24 as described below may in fact be die cast as a single, integral piece if desired. Plate 16 is shaped and otherwise arranged and configured to fit or to be retrofitted into a luminaire 20, such as the conventional Cobra Head luminaire 20 shown in FIGS. 8-10. While the example embodiments described herein concentrate on a particular class of luminaire, namely the ubiquitous 'Cobra Head', it is expressly within the scope of the invention that many other different existing luminaire types and shapes could be used. It must also be expressly understood that plate 16 will be appropriately configured according to the type luminaire might be chosen.

However, it is to be noted that in the illustrated embodiment there is no need for a protective covering, face plate, lens or bezel to be combined with the luminaire 20 when the light bars 12 are retrofitted into the luminaire 20. In fact, the use of such coverings, face plates, lenses or bezels typically results in the loss of 20-30% of the useful light from the luminaire 20. Light bars 12 are directly exposed to the environment and provide light to the street or other application without the need for any additional protection and without the loss typically suffered from such protections. Thus, in a retrofitted embodiment, the protective covering. face plate, lens or bezel is permanently removed when module 10 is installed.

In the embodiment of FIG. 1, light bars 12 are recessed into plate 16 which is provided with a depth bordering the plurality of light bars 12 to provide a bordering peripheral shield 22 to provide shadowing of the collective light beam from luminaire 20 to provide earth friendly, Dark Sky Initiative compliance. Le. high angle sky rays from LEDs 14 directed at or above the horizon are blocked by the peripheral shield 22. However, it is also contemplated that arrays 12 may also be provided with LEDs 14 that are each optically equipped with an appropriate optic to provide earth friendly. Dark Sky Initiative compliance even if flatly or flushly mounted on plate 16 without any bordering peripheral shield 22.

Figure 5:
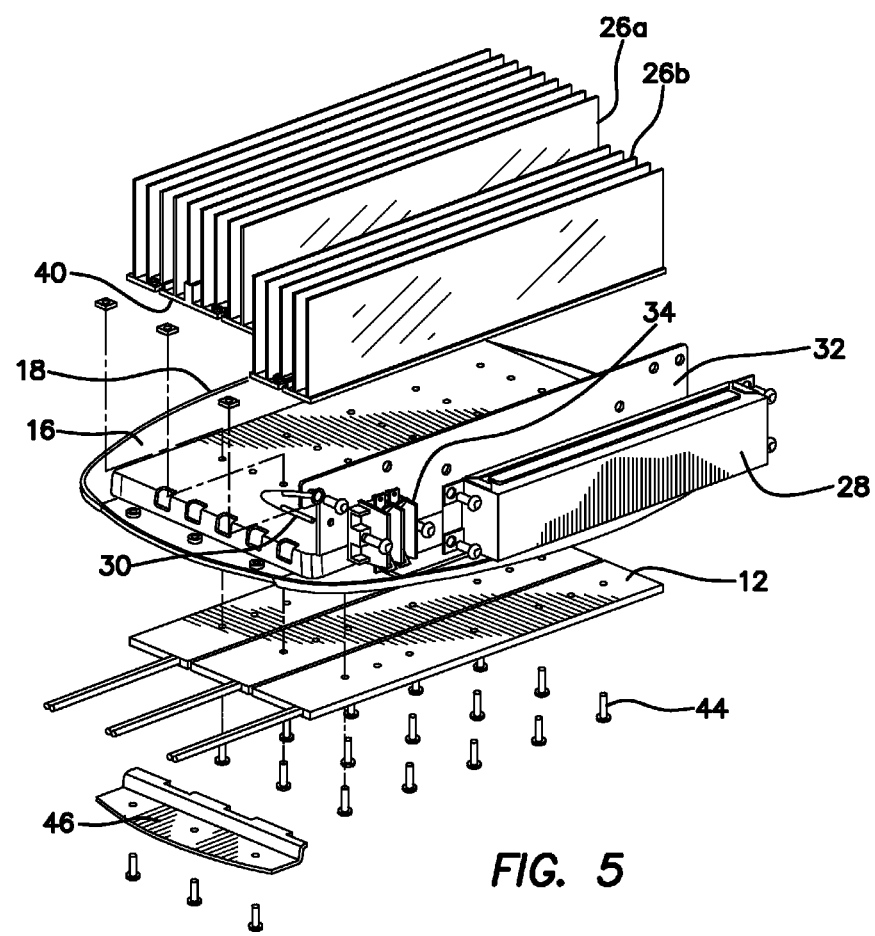
FIG. 5 is an exploded perspective view the embodiment of the invention described in FIGS. 1-4.

In the illustrated embodiment, light bars 12 are fixed to plate 16 by conventional bolt and nut fasteners 44. best seen in the exploded perspective view of FIG. 5, but it is to be understood that plate 16 can be adapted to engage light bars 12 by resilient snap fittings in plate 16 if desired to facilitate quick replacement.

Figure 2:
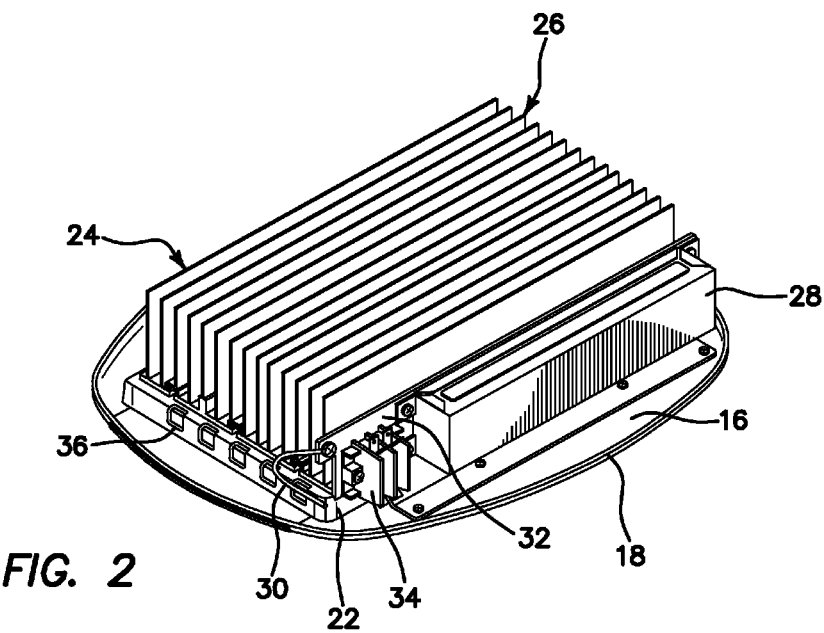
FIG. 2 is a perspective view of the upper or inside surface of the embodiment of the invention of FIG. 1.
Figure 3:
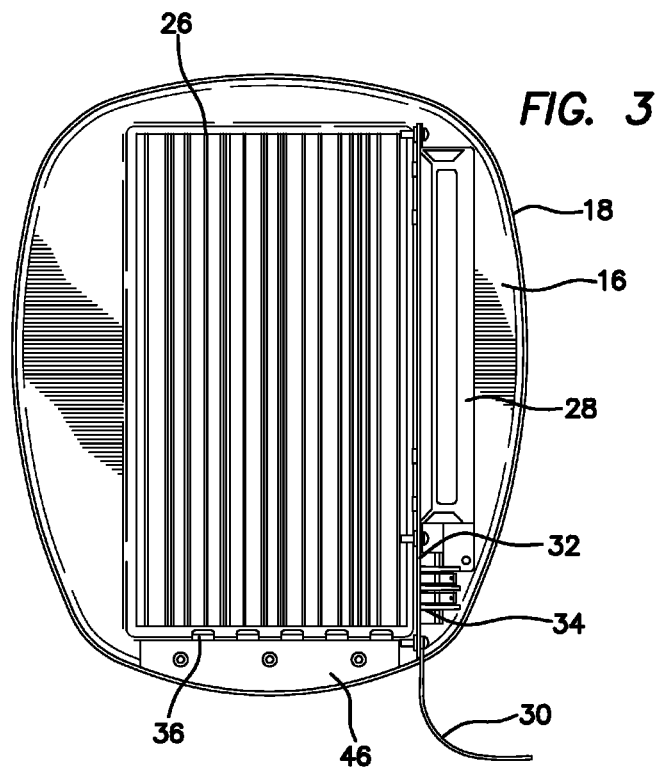
FIG. 3 is the top plan view of the embodiment shown in FIGS. 1 and 2.
Figure 4:
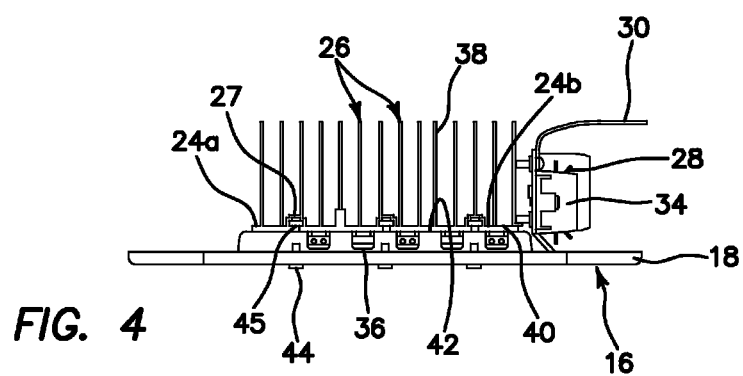
FIG. 4 is the end plan view of the embodiment of the invention shown in FIGS. 1-3.
Figure 7:
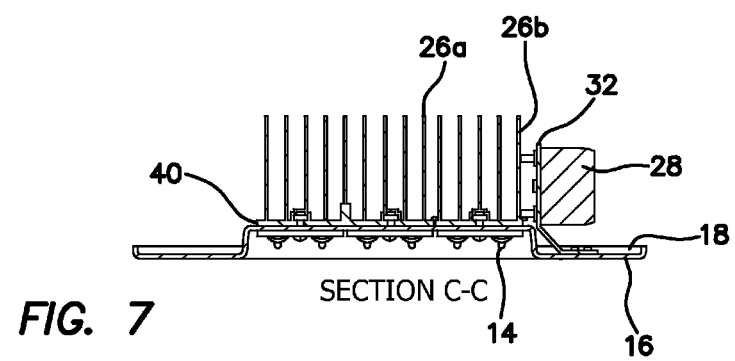
FIG. 7 is a cross-sectional view of the embodiment of FIGS. 1-6 as seen through section lines C-C in FIG. 6. This view describes an embodiment of the invention where the light bar(s) are recessed.
Figure 8:
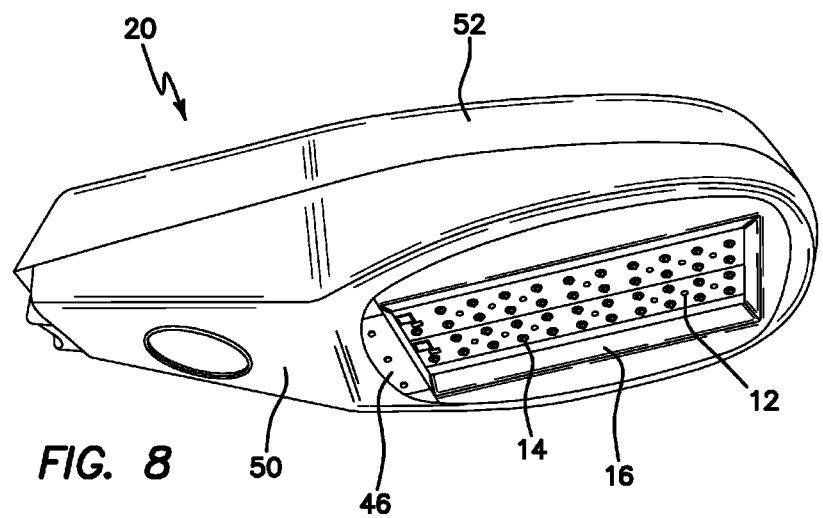
FIG. 8 is a side view photograph of an illustrated embodiment of the invention mounted inside of a 'Cobra Head' luminaire manufactured by Cooper Lighting, LLC of Peachtree City, Ga.
Figure 9:
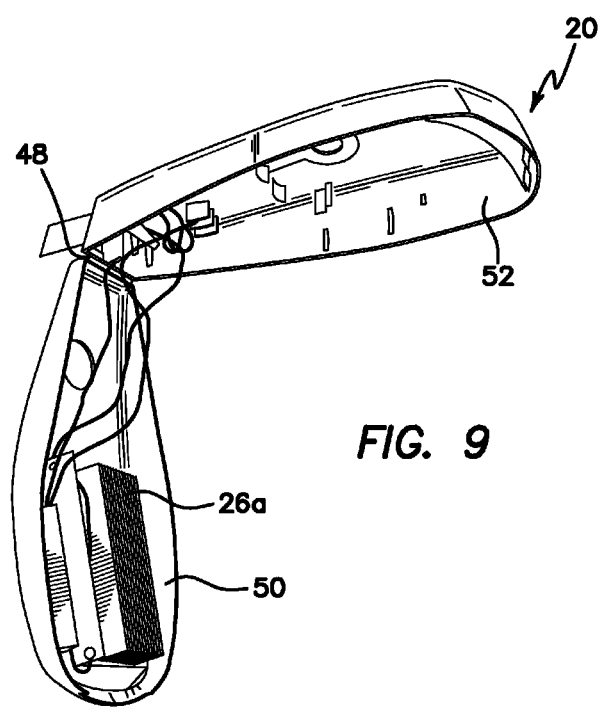
FIG. 9 is a perspective side view photograph of the embodiment of FIG. 8 with the hinged door of the luminaire shown in an open condition. This view shows the embodiment of the invention mounted in place in the 'door' of the luminaire and attached to the electrical source.
Figure 10:
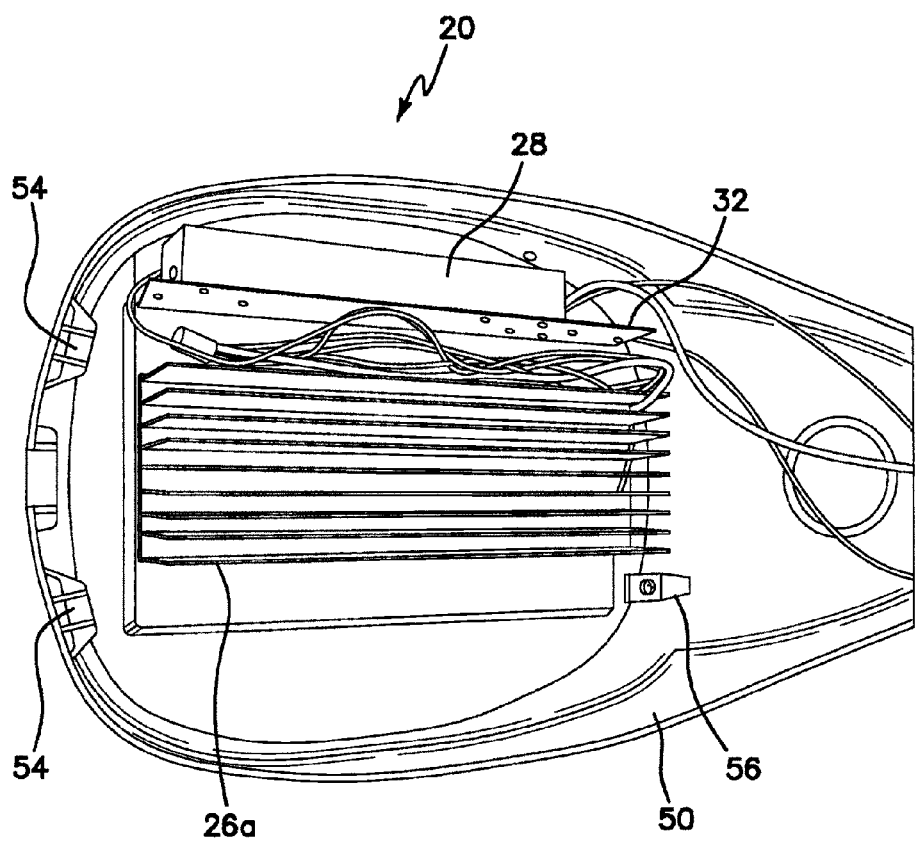
FIG. 10 is a perspective photographic view of the embodiment of FIGS. 8 and 9 showing a means for mounting the embodiment of the invention to the luminaire. In this embodiment the device uses the existing mounting means of the luminaire's original window to mount the device.

FIG. 2 is a perspective view of the upper or inside surface of the embodiment of FIG. 1 showing a heat sink 24 which a plurality of fins 26 thermally and mechanically coupled to light bars 12 and/or LEDs 14 and to plate 16. As will be described in connection with FIGS. 4 and 5 heat sink 24 is scalable in the sense that it is provided as a two-part sink 24a and 24b, which may be operatively and selectively configured to operate with one, two or three light bars 12 without redesign of the module 10. It is to be expressly understood that the scope of scalability of the design without design modification also includes a design which could similarly accommodate four or any specific number of light bars and heat sinks without design modification according to the teaching and spirit of the illustrated embodiments. The end plan view of FIG. 4 shows that fins 26 a plurality of vertically extending heat dissipating finned surfaces 38 extending from a base 40. In the illustrated embodiment heat sink 24 is fabricated in at least two sections 24a and 24b which nest or fit with adjacent sections by overlapping flanges 42 defined in base 40 as best shown in FIGS. 4 and 5. Section 24a of heat sink 24 is shown in the left in the illustration of FIG. 4 and has a width so that it spans two light bars 12. Section 24b of heat sink 24 is shown in the right in the illustration of FIG. 4 and has a width so that it spans one light bar 12. By combining both sections 24a and 24b three light bars 12 are operatively thermally coupled to heat sink 24. Alternatively, only two light bars 12 could be mounted in plate 16 and only section 24a coupled thereto as shown in the assembled Cobra Head luminaire 20 as shown in FIGS. 8-10. It can readily be understood by viewing the view of FIG. 7 how both light bars 12 and heat sink 24 can be selectively scalable. FIG. 7 shows a three-light bar embodiment, but two light bars can also be provided and attached to plate 16 aligned along the center of plate 16 by mounting holes in plate 16 provided for bolts 44 for this particular alignment. Section 24b is removed from plate 16 in the configuration of FIGS. 4 and 7 and section 24a is then similarly mounted and aligned along the center of plate 16 in alignment with the two opposing light bars 12. Sections 24a and 24b are provided with prismatic channels 27 running along the longitudinal length of sections 24a and 24b as seen in end cross sectional view in FIG. 4 in which the nuts 45 on bolts 44 are captured and which also serve to attach sections 24a and 24b to plate 16. In the embodiment where a single light bar 12 is desired, only section 24b in the views of FIGS. 4 and 7 is provided, mounted and aligned along the center of plate 16 in alignment with the single opposing light bar 12. In this manner, module 10 can be readily changed from one light bar to multiple (e.g., two, three, etc.) light bar embodiments either in the field or at the time of original assembly without any alteration in the design of module 10 being necessary.

Power and power control is provided to light bars 22 through module 28 mounted to one side of a mounting flange 32 which is also coupled to plate 16 and which is electrically coupled to grounding wire 30. Module 28 includes a weatherproof enclosure. Electrical connections to module 28 can be made directly through twist-on or compression wire couplings tied to the walls of the enclosure or through a terminal block 34 shown in the embodiment of FIG. 2. Other quick-connect/disconnect methods may be used as well. Module 28 may also house other types of street light control and communication Circuitry. For example, the lighting apparatus further comprises pulse width modulation (PWM) circuitry or an onboard power conversion circuit and where electrical power is supplied to the at least one light bar via the pulse width modulation (PWM) circuitry or onboard power conversion circuit. The lighting apparatus further comprises dimming controls, color controls or electronics applicable to outdoor lighting. The electronics applicable to outdoor lighting comprises a network addressing circuit, a radio frequency control circuit or a communication circuit. Such examples, by no means exhaust the possible number or types of lighting circuits that can be accommodated and exploited in module 10.

Figure 6:
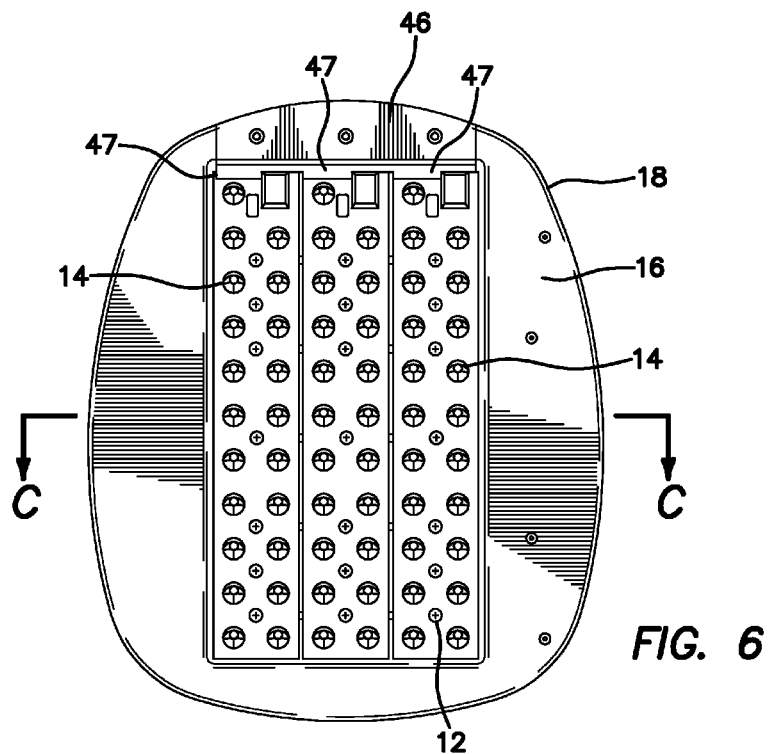
FIG. 6 is a bottom plan view of the embodiment of FIGS. 1-5

When the exploded assembly of components as depicted in FIG. 5 are assembled, they appear as shown in the bottom plan view FIG. 6 and in cross-sectional side view as seen through section lines C-C in FIG. 6 as shown in FIG. 7. The lower half of luminaire 20 is hinged on its rear end 48, opening up like a clam shell as shown in FIG. 9. The assembly of FIGS. 1-7 or an embodiment thereof is then installed in the lower shell 50, and is clipped or retained by a flange edge at one end and locked in by retention plate 46 at the opposing end, which plate 46 is fixed to shell 50 by conventional threaded fasteners as shown in FIG. 6. Retention plate 46 includes angled flanges 47 which bear against the ends of adjacent light bars 12 to secure the LEDs 14 on the adjacent end of light bars 12 and the extreme end of the corresponding light bar 12 into thermal and/or physical contact with heat sink 24, since there is no adjacent or contiguous hold down bolts 44 due to their end position as is the case with each of the other LEDs 14 on each light bar and the opposing end of the light bar 12. By the same means retention plate 46 serves to retain light bars 12 onto plate 16. As shown in the embodiment of FIG. 6 a separate flange 47 is provided for each of three separate light bars 12, but it is to be understood that retention plate 46 is also scalable in the sense that the spacing and length of flanges 47 are such that retention plate 46 is also equally effective with one or two light bars 12 installed onto plate 16 without the need for any redesign.

The inside or top surface of the module 10 of a three-light bar embodiment like that shown in FIGS. 1-7 is when installed in the lower shell 50 similar to that depicted in the photographic view of FIG. 10 showing a two-light bar embodiment and is wired into the conventional electrical power connections in upper shell 52 as best seen in FIG. 9. As shown in FIG. 10 module 10 is retained in the Cobra Head installation by insertion of one end of plate 16 under fixed flanges 54 extending from the forward inner edge of lower shell 50 and unfastening one or more screw clips 56 extending over the opposing edge of plate 16 from the opposing edge of lower shall 50. When service or replacement is required, the entire module 10 of FIGS. 1-7 can be removed from lower half shell 50 as shown in FIG. 10 by unfastening one or more clips 56, decoupling the wiring led through upper half shell 52, module 10 lifted out from flanges 54, and a new or refurbished module 10 inserted and secured by reversing these steps. The entire process requires only less than one half hour to accomplish.

Many alterations and modifications may be made by those having ordinary skill in the art without departing from the spirit and scope of the invention. Therefore, it must be understood that the illustrated embodiments have been set forth only for the purpose of providing examples and that it should not be taken as limiting the invention as defined by the claims below.

In summary, it may now be appreciated that what is disclosed above in the illustrated embodiments is a lighting apparatus for retrofitting an existing luminaire comprising: a plurality of light emitting diodes (LED) of similar or differing wavelengths arranged and configured in at least one light bar array; a heat sink module thermally coupled to the at least one light bar array; an electronic power module electrically coupled to the at least one light bar array; and a plate coupled to the at least one light bar array, electronic power module and the heat sink module, the plate arranged and configured for coupling to the luminaire to provide quick and easy installation and replacement of the at least one light bar array, heat sink module and electronic power module into and from the luminaire. It is to be expressly understood that the lighting apparatus for retrofitting an existing luminaire need not include the power module as an integral part of its assembly, but that a preexisting power module in the luminaire could be used if appropriate or that a retrofitted or new power module could be installed separately into the luminaire. Uses of the invention include street lighting, parking lot and pathway lighting or any indoor or outdoor venue where a broad beam of light is desired at low cost and long life. In one case the preexisting luminaire comprises a Cobra Head luminaire. The preexisting luminaire is originally provided with a conventional non-LED light source, which is removed from the luminaire and replaced in situ by the at least one light bar array, heat sink module, electronic power module and plate without mechanical or electrical redesign or modification of the luminaire. The luminaire has a preexisting opening through or from which light is provided and where the plate comprises a shaped plate that fits in the existing opening of the luminaire, the plate including a recessed cavity to accommodate the at least one light bar and to provide shadowing of light from the at least one light bar array to provide earth friendly, Dark Sky Initiative compliance. The recessed cavity in the plate comprises a recessed formed in a stamped shaped plate. The luminaire includes preexisting mounting features, where the plate includes a perimeter and where the perimeter of the plate is rolled or formed and cut to fit the preexisting mounting features of the luminaire. The plate has a backside, the luminaire has an interior cavity, and the heat sink module comprises a heat sink extrusion coupled to the backside of the plate to transfer heat generated from the LEDs into the interior cavity of the luminaire, as well as transferring heat through the sides of the recessed plate acting as a peripheral heat fin. The plate is disposed between the heat sink module and the at least one light bar. The lighting apparatus further comprises a transformer or power source coupled to the at least one light bar and where the at least one light bar includes a plurality of LEDs electrically coupled together in series, parallel or both. The foregoing summarization is set forth for the purposes of illustration of some embodiments and should not be understood as defining or limiting the invention.

Figure 11:
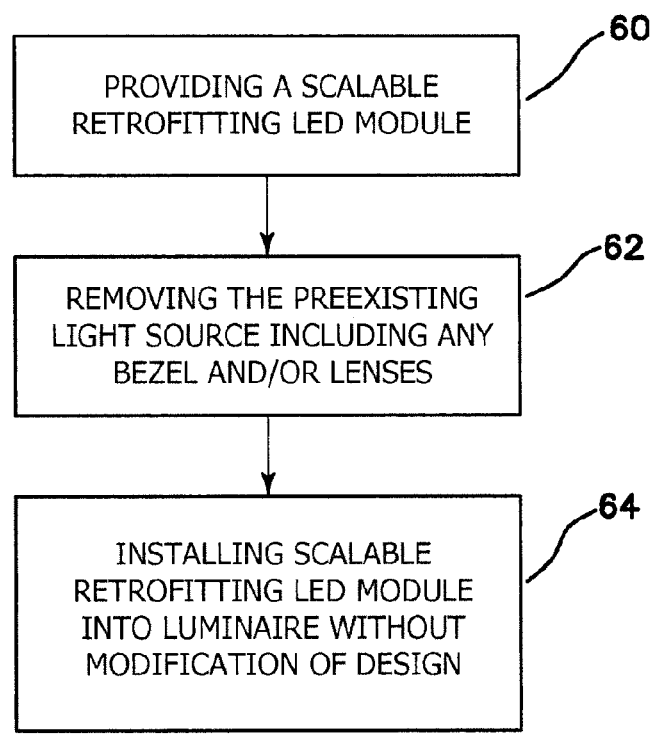
FIG. 11 is a flow diagram of an embodiment of the invention realized as a method of retrofitting a preexisting luminaire with anyone of the light modules of FIGS. 1-10.

The illustrated embodiments of the invention can now also be understood to include within their scope a method of retrofitting an existing luminaire as illustrated in the flow diagram of FIG. 11 comprising the steps of: providing in step 60 a plurality of light emitting diodes (LED) of similar or differing wavelengths arranged and configured in at least one light bar array, a heat sink module thermally coupled to the at least one light bar array. an electronic power module electrically coupled to the at least one light bar array, and a plate coupled to the at least one light bar array, electronic power module and the heat sink module, the plate arranged and configured for coupling to the luminaire to provide quick and easy installation and replacement of the at least one light bar array, heat sink module and electronic power module into and from the luminaire, the at least one light bar, heat sink, electronic power module and plate being combined into an LED assembly arranged and configured to be readily disposed in or on the luminaire and electrically coupled thereto or therethrough; removing in step 62 a preexisting light source from the luminaire including any protective glass coverings and/or lenses; and installing in step 64 the LED assembly in or on the luminaire without any other modification of the luminaire. The steps of removing the preexisting light source and installing the LED assembly are performed in situ without mechanical or electrical redesign or modification of the luminaire. The luminaire has a preexisting opening through or from which light is provided and the plate comprises a shaped plate that fits in the existing opening of the luminaire, the plate including a recessed cavity to accommodate the at least one light bar. The method further comprises the step of shadowing of light from the at least one light bar array to provide earth friendly, Dark Sky Initiative compliance. The luminaire includes preexisting mounting features, the plate includes a perimeter, and the step of installing the LED assembly in or on the luminaire without any other modification of the luminaire comprises rolling or forming and cutting the perimeter of the plate to fit the preexisting mounting features of the luminaire. The plate has a backside, the luminaire has an interior cavity, and the heat sink module comprises a heat sink extrusion coupled to the backside of the plate. The method further comprises the steps of generating heat from the LEDs and transferring heat generated from the LEDs into the interior cavity of the luminaire. The method further comprises the step of powering the at least one light bar with pulse width modulation (PWM) circuitry or an onboard power conversion circuit. The method further comprises the step of dimming the at least one light bar, controlling or forming color of light generated by the at least one light bar, addressing a network, controlling the at least one light bar using radio frequency control or communicating information to or from the at least one light bar with a remote system. The foregoing summarization is set forth for the purposes of illustration of some embodiments and should not be understood as defining or limiting the invention.

Thus, in light of the description of the illustrated embodiments above, it can now be appreciated that various advantages of at least some of the illustrated embodiments may include a modular, efficient replacement lamp that provides all the basic outdoor lighting IES light patterns (Types 1-5), meets the parameters of the Dark Sky Initiative, fits into a multiplicity of Cobra Head lamp fixtures and provides energy savings of 50% or better than traditional light sources. Another advantage of at least some of the illustrated embodiments is the ability to replace vast systems of traditional outdoor lighting with LED lights at a fraction of the cost of installing new LED luminaires.

Therefore. it must be understood that the illustrated embodiments have been set forth only for the purpose of providing examples and that they should not be taken as limiting the invention as defined by the following claims. For example, notwithstanding the fact that the elements of a claim are set forth below in a certain combination, it must be expressly understood that the invention may include other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore. defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for anyone of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conception ally equivalent, what can be obviously substituted and also what essentially incorporates the essential idea of the invention.

We claim:

1. A method for retrofitting a street light that comprises a light source mounted in an enclosure and an opening in the enclosure,
   the method comprising the steps of:
   opening a door to the enclosure;
   removing from the street light the light source and a light permeable member;
   installing a member in the enclosure and adjacent to the opening, the member comprising an array of LEDs disposed adjacent a first side of a member, heat sink fins attached to a second side of the member, and a power module electrically connected to the array of LEDs; and
   closing the door to the enclosure.

2. The method of claim 1,
   wherein subsequent to completing the steps of claim 1, the array of LEDs are disposed to emit light through the opening in the enclosure.

3. The method of claim 1, wherein the member and the heat sink fins are die cast as an integral piece.

4. The method of claim 1, wherein the door of the enclosure includes the opening of the enclosure.

5. The method of claim 1, wherein the steps of claim 1 are performed while the street light remains attached to a pole.

6. The method of claim 1, wherein the member fits in the opening.

7. The method of claim 1, wherein the door is hinged, and wherein the light permeable member comprises a protective glass cover, a protective plastic cover, a face plate, or a lens.

8. The method of claim 1, wherein the retrofitted street light is Dark Sky Initiative compliant.

9. The method of claim 1, wherein the array of LEDs is recessed relative to a surface of the enclosure that faces a surface to be illuminated.

10. The method of claim 1, wherein the array of LEDs is recessed relative to a peripheral edge of the opening.

11. The method of claim 1, wherein the retrofitted street light blocks a light ray from the array that is directed at or above the horizon.

12. A system for retrofitting an outdoor luminaire that comprises an opening through which or from which light is provided, the system comprising:
   a plate that is shaped to fit the opening and that comprises a recess;
   an array of light emitting diodes disposed in the recess along a surface of the plate; and
   an electronic power module electrically coupled to the array of light emitting diodes, wherein a heat sink projects from the plate opposite the recess.

13. The system of claim 12, wherein the plate is operable to mitigate light pollution of the array.

14. The system of claim 12, wherein the outdoor luminaire comprises a lens covering the opening and a lamp, and wherein the system replaces the lens and the lamp.

15. The system of claim 12, wherein the recess is of sufficient depth to interfere with one or more rays of light emitted by the array that would otherwise contribute to light pollution.

16. The system of claim 12, wherein the system is Dark Sky Initiative compliant.

17. The system of claim 12, wherein the system is operative to block a light ray from the array that is directed at or above the horizon.

18. A system for retrofitting a street light that comprises a light source mounted in an enclosure, the enclosure comprising: (i) a door that opens towards a surface to be illuminated or is removable, (ii) an aperture through which or from which light from the light source is provided towards the surface; and (iii) a light penetrable cover disposed at the aperture, the system comprising:
   a die cast plate dimensioned to fit the aperture and comprising a first side from which heat sink fins protrude and a second side;
   an array of light emitting diodes disposed along the second side; and
   a power supply disposed adjacent the second side for powering the light emitting diodes,
   wherein the system replaces the light penetrable cover and the light source.

19. The system of claim 18, wherein the second side comprises a cavity in which the array of light emitting diodes is disposed, and wherein the cavity has an edge that is disposed to occlude light produced by the array.

20. The system of claim 18, wherein the system is dimensioned for retrofit installation in the street light through the door when opened or when the door is removed.

21. The system of claim 18, wherein the system is adapted for an retrofit of the street light via the door while the street light remains attached to a pole.

\* \* \* \* \*